US008221647B2

(12) United States Patent
McKedy

(10) Patent No.: US 8,221,647 B2
(45) Date of Patent: Jul. 17, 2012

(54) OXYGEN-ABSORBING COMPOSITION

(75) Inventor: George E. McKedy, Williamsville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 760 days.

(21) Appl. No.: 11/135,183

(22) Filed: May 23, 2005

(65) Prior Publication Data

US 2005/0205841 A1 Sep. 22, 2005

Related U.S. Application Data

(62) Division of application No. 10/298,369, filed on Nov. 18, 2002, now Pat. No. 6,899,822.

(51) Int. Cl.
*C02F 1/70* (2006.01)
*C08K 3/08* (2006.01)

(52) U.S. Cl. ............... 252/188.28; 524/401; 524/423; 524/431; 524/439

(58) Field of Classification Search ............. 502/406; 252/188.28
See application file for complete search history.

(56) References Cited

U.S. PATENT DOCUMENTS

| | | | |
|---|---|---|---|
| 4,336,063 A * | 6/1982 | Guzman-Bofill et al. | 75/496 |
| 4,510,162 A | 4/1985 | Nezat | |
| 5,077,111 A | 12/1991 | Collette | |
| 5,089,323 A | 2/1992 | Nakae et al. | |
| 5,153,038 A | 10/1992 | Koyama et al. | |
| 5,262,375 A * | 11/1993 | McKedy | 502/406 |
| 5,274,024 A * | 12/1993 | Koyama et al. | 524/440 |
| 5,492,742 A | 2/1996 | Zenner et al. | |
| 5,639,815 A | 6/1997 | Cochran et al. | |
| 5,744,056 A * | 4/1998 | Venkateshwaran et al. | 252/188.28 |
| 5,759,653 A | 6/1998 | Collette et al. | |
| 5,776,361 A | 7/1998 | Katsumoto et al. | |
| 5,804,236 A | 9/1998 | Frisk | |
| 5,830,545 A | 11/1998 | Frisk | |
| 5,885,481 A | 3/1999 | Venkateshwaran et al. | |
| 5,889,093 A | 3/1999 | Hatakeyama et al. | |
| 6,209,289 B1 | 4/2001 | Cullen et al. | |
| 6,369,148 B2 * | 4/2002 | Chiang et al. | 524/417 |
| 6,586,514 B2 | 7/2003 | Chiang et al. | |
| 2001/0003235 A1 * | 6/2001 | Eto et al. | 53/479 |
| 2003/0108702 A1 * | 6/2003 | Tung et al. | 428/35.7 |

FOREIGN PATENT DOCUMENTS

| | | | |
|---|---|---|---|
| EP | 0836935 A2 * | 4/1998 | |
| EP | 884173 A2 | 12/1998 | |
| EP | 1106669 A1 | 6/2001 | |
| JP | S54-11089 | 1/1979 | |
| JP | S60-129137 | 7/1985 | |
| JP | 2002-506904 | 3/2002 | |
| WO | WO 01/25369 A1 * | 4/2001 | |

OTHER PUBLICATIONS

Japanese Patent Office Notification of Reasons for Rejection for corresponding Japanese Patent Application No. 2004-553442.
Korean Intellectual Property Office, Notice of Preliminary Rejection dated Jun. 28, 2010, 5 pages, English translation, 6 pages.
European Patent Office, Office Action dated Feb. 24, 2011, 4 pages.

* cited by examiner

*Primary Examiner* — Peter F Godenschwager
(74) *Attorney, Agent, or Firm* — Stephen B. Salai, Esq.; Jodi A. Reynolds, Esq.; Harter Secrest & Emery LLP

(57) ABSTRACT

An oxygen-absorbing composition for use as a component of a plastic packaging material that includes in relatively sufficient proportions iron, acidifier, and electrolyte.

20 Claims, No Drawings

OXYGEN-ABSORBING COMPOSITION

CROSS-REFERENCE TO RELATED APPLICATIONS

This application is a Divisional of pending parent application Ser. No. 10/298,369, filed Nov. 18, 2002, entitled Oxygen-absorbing Composition.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

The present invention relates to an oxygen-absorbing composition for combining with a resin to impart an oxygen-absorbing quality thereto so that it can be used as plastic packaging material for the purpose of absorbing oxygen within a container that includes such packaging material.

By way of background, various resins, especially polyethylene and the polyester poly-ethylene-terephthalate, are used as containers for various foodstuffs and materials that may be deleteriously affected by oxygen. It is desirable to have an oxygen-absorber as a component of the packaging material so that any oxygen within the container can be absorbed thereby. Furthermore, it is desirable that the oxygen-absorber should be one which acts reasonably rapidly in the packaging material so that it will absorb the oxygen before the oxygen can materially affect the quality of the goods, such as food, within the container. It is with such an oxygen-absorbing composition for use as a component of a resin packaging material that the present invention is concerned.

BRIEF SUMMARY OF THE INVENTION

It is one object of the present invention to provide an improved oxygen-absorbing composition for use as a component of a resin packaging material, which will absorb oxygen reasonably rapidly.

Another object of the present invention is to provide an improved oxygen-absorbing composition for use as a component of resin packaging material which is relatively simple and which will combine well with a plastic.

A further object of the present invention is to provide an improved oxygen-absorbing composition for use as a component of resin packaging material, which will not detract from the physical characteristics of a container or package. Other objects and attendant advantages of the present invention will readily be perceived hereafter.

The present invention relates to an oxygen-absorbing composition for combination with a resin to effect oxygen-absorption thereby comprising in relatively sufficient proportions iron, an acidifier and an electrolyte.

The present invention also relates to an oxygen-absorbing composition for combination with a resin to effect oxygen-absorption thereby consisting essentially in relatively sufficient proportions iron, an acidifier and an electrolyte.

The various aspects of the present invention will be more fully understood when the following portions of the specification are read.

BRIEF DESCRIPTION OF THE SEVERAL VIEWS OF THE DRAWING(S)

Not applicable.

DETAILED DESCRIPTION OF THE INVENTION

As noted above, the oxygen-absorbing composition of the present invention is for use as a component of resin packaging materials, including rigid plastic containers and flexible packaging materials, including sheet and film plastics.

The oxygen-absorbing composition of the present invention comprises in relatively sufficient proportions iron, an acidifier, which is preferably sodium bisulfate, and an electrolyte, which is preferably sodium chloride. As is well understood in the art, the iron in the presence of an electrolyte functions as an oxygen-absorber. The acidifier in the composition provides an acidic environment that hastens the oxygen-absorption. However, it is not known that an oxygen-absorbing composition including iron, acidifier and the electrolyte was previously used as a component of a resin to cause the resin to have desirable oxygen-absorbing qualities.

The types of iron that can be used are hydrogen reduced iron, especially sponge grade, annealed electrolytically reduced iron and carbonyl iron. The hydrogen reduced sponge grade iron is preferred because it has been found that it functions significantly better than other irons. It is believed that this better functioning is due to the fact that the sponge grade hydrogen reduced iron has a rough surface that is larger than the surface of annealed electrolytically reduced iron, which is spherical. However, other types of iron including but not limited to non-annealed electrolytically reduced iron can also be used in addition to the various irons noted above.

In a preferred composition comprising iron, sodium bisulfate and sodium chloride, the iron may be present by weight in an amount of between about 50% and 98%, and more preferably between about 75% and 95%, and most preferably between about 80% and 90%.

The majority of the iron may have a size of between about 150 microns and 1 micron, and more preferably between about 100 microns and 5 microns, and most preferably between about 50 microns and 5 microns.

The sodium bisulfate may be present by weight in an amount of between about 1% and 30%, and more preferably between about 4% and 20%, and most preferably between about 5% and 18%.

The majority of the sodium bisulfate may have a size of between about 150 microns and 1 micron, and more preferably between about 100 microns and 5 microns, and most preferably between about 50 microns and 5 microns. However, if desired, the sodium bisulfate or any other acidifier may be applied as a solution to the iron and the solvent can then be removed, leaving a deposit of the acidifier on the iron.

While sodium bisulfate is the preferred acidifier in the composition, potassium bisulfate was also tested and found to function satisfactorily. Also, other acids and acid salts will function satisfactorily as the acidifier. These may include, without limitation, fumaric acid, sodium diacetate, citric acid and sodium salt of acetic acid. These other acidifiers may be of the same size ranges and be used in the relative proportions with respect to the sodium bisulfate, depending on their relative molecular weights and acidity.

The sodium chloride, which is the preferred electrolyte, may be present by weight in an amount of at least about 0.1% provided that it is mixed well enough with the other components to produce the desired electrolytic action, and more preferably between about 0.5% and 4%, and most preferably between about 1% and 3%. As a practical matter, only a minimum amount of salt is necessary to produce the desired electrolytic action, and any excess salt merely takes the place of iron, which actually produces the oxygen-absorption.

The majority of the sodium chloride may have a particle size of between about 150 microns and 1 micron, and more preferably between about 100 microns and 5 microns, and most preferably between about 50 microns and 5 microns. However, if desired, the sodium chloride or any other electrolyte may be applied as a solution to the iron and the solvent can then be removed, leaving a deposit of the electrolyte on the iron. Also, the electrolyte and the acidifier may be carried by the same solvent and applied to the iron simultaneously.

While sodium chloride is the preferred electrolyte, other electrolytes, including but not limited to potassium chloride, sodium iodide and calcium chloride, may be of the same size ranges and be used in the same proportions as noted above for the sodium chloride.

Actual tests of compositions which were found to function satisfactorily when combined with polyethylene and with poly-ethylene-terephthalate comprised by weight (1) 80% iron, 16% sodium bisulfate and 4% sodium chloride, and (2) 90% iron, 8% sodium bisulfate and 2% sodium chloride.

The preferred composition consisted by weight of 90% hydrogen reduced sponge grade iron, 8% sodium bisulfate and 2% sodium chloride. The iron was of a particle size that passed through a 325 mesh screen having the designation "USA Standard Sieve ASTM Specification E-11." The particle size analysis of the foregoing iron was: 11.8% was less than 10 microns, 27.03% was above 36 microns and the average was 28.25 microns. However, the distribution of particle sizes will vary from batch to batch. Annealed electrolytically reduced iron was also found to be satisfactory in the above composition. The sodium bisulfate was ground to a size that passed through a 325 mesh screen. The sodium bisulfate had an average size of 8 microns with a top size of 20 microns. The sodium chloride was a commercially obtainable 325 mesh size; and for the particle size distribution, 1% was greater than 200 mesh (74 microns) and 95% was less than 325 mesh (43 microns).

EXAMPLE I

Pelletized Dowlex 2517 linear low density polyethylene was melted in an oven. Once melted, 2.5% by weight of the following oxygen-absorbing blend was thoroughly mixed in. The oxygen-absorbing blend consisted by weight of 90% sponge grade hydrogen reduced iron which passed through a 325 mesh screen and had a size distribution wherein 11.8% was less than 10 microns, 27.03% was above 36 microns and the average was 28.25 microns. The oxygen-absorbing blend also contained 8% by weight of sodium bisulfate and 2% by weight of sodium chloride, both of which had the size ranges set forth in the preceding paragraph. Prior to mixing the oxygen-absorbing composition with the melted polyethylene, it was blended in a Hobart mixer. The oxygen-absorbing blend was not milled after blending. Twenty-five grams of the thoroughly mixed composition of melted polyethylene and oxygen-absorber were placed on an Industry Tech hot plate set at 275° F. Using a 0.5 inch coating rod, a film was made by pulling the coating rod along the hot plate to form a film from the molten polyethylene containing the oxygen-absorber. A release liner had been placed on the hot plate before the molten resin and oxygen-absorber composition were placed on the hot plate so that the finished film would not stick to the hot plate.

The film was tested for oxygen-absorption in the following manner. Fifteen grams of the above oxygen-absorbing film were placed in an eight-inch by eight-inch barrier pouch made of biaxially oriented nylon. A three-inch by three-inch piece of wet blotter paper was also placed in the pouch as a moisture source to provide moisture for the oxygen-absorbing reaction. The pouch was then vacuum sealed. The pouch was filled with 500 cc of gas containing 0.4% oxygen and 99.6% nitrogen through a septum on the pouch. Since it was not possible to vacuum all of the original air out of the pouch, the oxygen content in the pouch was 1.5% as measured by a Mocon Pac Check Model 450 Head Space Analyzer. Initial oxygen readings were taken and then readings were taken every few days to measure the rate of oxygen-absorption. The oxygen-absorption is set forth in TABLE I.

EXAMPLE II

This example was performed in the same manner as described above in EXAMPLE I except that the oxygen-absorbing blend was milled in accordance with the following procedure. The same composition as described in EXAMPLE I was not blended in a Hobart mixer, but was blended in a Forberg mixer and the iron, sodium bisulfate and sodium chloride were then milled together in a jet mill to further decrease the particle size to an average of 25 microns with a range of 3 to 80 microns. The oxygen-absorption is set forth in TABLE I.

EXAMPLE III

This example was performed in the same manner as described above in EXAMPLE I except that the oxygen-absorbing blend consisted by weight of 80% sponge grade hydrogen reduced iron, 16% sodium bisulfate, and 4% sodium chloride. The oxygen-absorption is set forth in TABLE I.

EXAMPLE IV

This example was performed in the same manner as described above in EXAMPLE II except that the oxygen-absorbing blend was the same as set forth in EXAMPLE III. The oxygen-absorption is set forth in TABLE I.

The oxygen-absorbing characteristics of EXAMPLES I, II, III and IV are set forth in the following TABLE I along with a column labeled "Iron+2% NaCl" which consisted of iron and sodium chloride which were unmilled and blended in a Hobart mixer. The iron and sodium chloride were then combined with molten polyethylene, and then a film was made and tested for oxygen-absorbing capability in accordance with the procedure of EXAMPLE I. The sodium chloride had a 325 mesh size as described above, and the iron had an average 28 micron size.

TABLE I

OXYGEN-ABSORPTION IN CC
(OXYGEN-ABSORBING BLENDS IN POLYETHYLENE)

|  | EXAMPLE | | | | Iron + 2% NaCl |
| --- | --- | --- | --- | --- | --- |
|  | I | II | III | IV |  |
| INITIAL $O_2$ CONTENT (cc) | 6.90 | 7.75 | 8.35 | 8.55 | 7.35 |
| 1 Day | 1.3 | 2.5 | 2.2 | 2.85 | .98 |
| 4 Days | 3.27 | 5.83 | 5.41 | 5.59 | 2.35 |
| 8 Days | 4.72 | 7.03 | 6.67 | 7.78 | 3.21 |
| 12 Days | 5.07 | 7.14 | 6.74 | 8.29 | 3.41 |
| 15 Days | 5.31 | 7.14 | 6.85 | 8.32 | 3.63 |

From comparing the examples with sodium bisulfate with the column of Iron+2% NaCl in TABLE I, it can be seen that the acidifier greatly enhances the oxygen-absorption. From TABLE I it can also be seen that the oxygen-absorption of EXAMPLES II and IV, where the oxygen-absorbing composition was milled, is much greater than in EXAMPLES I and III, respectively, where the oxygen-absorbing composition was not milled.

EXAMPLE V

This example was performed in the same manner as EXAMPLE I except that the resin is a polyester, namely, poly-ethylene-terephthalate, commercially known as VORIDIAN CB-12. The oxygen-absorbing characteristics are set forth in TABLE II.

EXAMPLE VI

This example was performed in the same manner as EXAMPLE II except that the resin is a polyester as set forth in EXAMPLE V. The oxygen-absorbing characteristics are set forth in TABLE II.

EXAMPLE VII

This example was performed in the same manner as EXAMPLE III except that the resin is a polyester as set forth in EXAMPLE V. The oxygen-absorbing characteristics are set forth in TABLE II.

EXAMPLE VIII

This example was performed in the same manner as EXAMPLE IV except that the resin is a polyester as set forth in EXAMPLE V.

The oxygen-absorbing characteristics of EXAMPLES V, VI, VII and VIII are set forth in TABLE II along with a column labeled "Iron+2% NaCl" which consisted of iron and sodium chloride which were unmilled and blended in a Hobart mixer. The iron and sodium chloride were then combined with molten polyethylene and then a film was made and tested for oxygen-absorbing capability in accordance with the procedure of EXAMPLE I. The sodium chloride had a 325 mesh size as described above, and the iron had an average 28 micron size.

TABLE II

OXYGEN-ABSORPTION IN CC
(OXYGEN-ABSORBING BLENDS IN POLY-ETHYLENE-TEREPHTHALATE)

|  | EXAMPLE | | | | Iron + 2% NaCl |
| --- | --- | --- | --- | --- | --- |
|  | V | VI | VII | VIII |  |
| INITIAL $O_2$ CONTENT (cc) | 8.05 | 8.25 | 8.30 | 8.15 | 8.65 |
| 1 Day | .08 | .23 | .12 | .23 | 0 |
| 4 Days | .25 | .42 | .17 | .45 | .03 |
| 8 Days | .37 | .55 | .20 | .77 | .03 |
| 11 Days | .38 | .67 | .25 | .93 | .08 |
| 15 Days | .38 | .78 | .28 | 1.08 | .15 |
| 19 Days | .42 | .87 | .30 | 1.25 | .15 |

From comparing the examples with sodium bisulfate with the column of Iron+2% NaCl in TABLE II, it can be seen that the acidifier greatly enhances the oxygen-absorption. From TABLE II it can also be seen that the oxygen-absorption of EXAMPLES VI and VIII, where the oxygen-absorbing composition was milled, is much greater than in EXAMPLES V and VII, respectively, where the oxygen-absorbing composition was not milled.

In the above TABLES I and II and in the following TABLES III and IV, the day designations denote the amount of oxygen absorbed after each day.

EXAMPLE IX

This example was performed in the same manner as EXAMPLE II and all parameters were the same except that the original oxygen content in the pouch was different.

EXAMPLE X

This example had the same formulation as EXAMPLES II and IX except that each of the ingredients of the oxygen-absorbing composition was milled separately and then blended in a Hobart mixer. As noted above, in EXAMPLES II and IX, in the oxygen-absorbing composition, the ingredients were milled together. After the separate milling the size range of the iron was an average of 22 microns. The size range of the sodium bisulfate was an average of 8 microns. The size range of the sodium chloride was an average of 8 microns.

The oxygen-absorbing characteristics of EXAMPLES IX and X are set forth in the following TABLE III along with a column labeled "Iron+2% NaCl" which consisted of iron and sodium chloride which were unmilled and blended in a Hobart mixer. The iron and sodium chloride were then combined with molten polyethylene and then a film was made and tested for oxygen-absorbing capability in accordance with the procedure of EXAMPLE I. The sodium chloride had a 325 mesh size as described above, and the iron had an average 28 micron size.

TABLE III

OXYGEN-ABSORPTION IN CC
(OXYGEN-ABSORBING BLENDS IN POLYETHYLENE)

|  | EXAMPLE | | Iron + 2% NaCl |
| --- | --- | --- | --- |
|  | IX | X |  |
| INITIAL $O_2$ CONTENT (cc) | 8.35 | 8.48 | 8.63 |
| 1 Day | 2.13 | 1.57 | .37 |
| 4 Days | 6.02 | 5.34 | .88 |
| 8 Days | 8.35 | 8.01 | 2.08 |

From a comparison of EXAMPLE II from TABLE I, where the ingredients of the oxygen-absorbing composition were milled together, with EXAMPLE X of TABLE III, where the ingredients of the oxygen-absorbing composition were milled separately, it can be seen that in the earlier days, the oxygen-absorption was more rapid in EXAMPLE II than in EXAMPLE X. The foregoing can also be seen from a comparison of EXAMPLES IX and X.

From comparing the examples with sodium bisulfate with the column of Iron+2% NaCl in TABLE III, it can be seen that the acidifier greatly enhances the oxygen-absorption.

While certain of the above tests used 2% by weight of sodium chloride to insure that there was sufficient electrolyte present for optimum results, experience with other oxygen-absorbers has shown that a very small percentage of the electrolyte sodium chloride is actually necessary to achieve a satisfactory electrolyte function; and therefore it is believed that amounts as low as 0.2% by weight and even lower percentages can actually be used.

While certain of the above tests used amounts as low as 8% by weight of sodium bisulfate, lesser amounts can be used; but the rapidity of oxygen-absorption would probably be diminished.

In actual use, a selected oxygen-absorbing resin composition of the type such as described in EXAMPLES I-VIII is pelletized and added to the same respective basic resin during the formulation of the ultimate products, such as bottles, sheets, films, trays and containers of various sorts. Therefore, the percentage of the oxygen-absorber in the ultimate product will be a much lower percentage than shown in the above examples. However, it will be appreciated that in certain instances, the above specifically described resin compositions of EXAMPLES I-VIII may be used at full strength to produce the final product.

While the resins which were tested in the above compositions were linear low density polyethylene and poly-ethylene-terephthalate, the oxygen-absorbing composition will also work with medium density and high density polyethylene and in varying degrees with other resins including but not limited to polypropylene, nylon, polyvinyl alcohol, urethane, acrylic, polyvinyl chloride and polystyrene, and various blends and copolymers thereof, depending on their specific permeabilities.

Where the ranges of iron, sodium bisulfate and salt are listed above, it will be appreciated that these ranges are applicable to both the unmilled and milled embodiments.

While preferred embodiments of the present invention have been disclosed, it will be appreciated that it is not limited thereto but may be otherwise within the scope of the following claims.

The invention claimed is:

1. An oxygen-absorbing composition for combining with a resin as a component thereof to effect oxygen-absorption comprising in relatively sufficient proportions by weight, milled iron, milled electrolytic acidifier, and milled electrolyte, said milled iron and milled electrolytic acidifier and milled electrolyte being of a size range wherein the majority of each is between about 1 micron and about 80 microns, wherein an average particle size of the milled electrolyte and milled electrolytic acidifier is approximately 8 microns and wherein the average particle size of the milled iron is approximately 28 microns, said milled iron, milled electrolytic acidifier, and milled electrolyte having been milled without the prior addition of water, wherein said milled electrolytic acidifier is selected from the group consisting of potassium bisulfate and sodium bisulfate.

2. An oxygen-absorbing composition as set forth in claim 1 wherein said iron, electrolytic acidifier, and electrolyte are milled separately and then combined.

3. An oxygen-absorbing composition as set forth in claim 1 wherein said iron, electrolytic acidifier, and electrolyte are combined and thereafter milled together.

4. An oxygen-absorbing composition for combining with a resin as set forth in claim 1 wherein said iron is sponge grade hydrogen reduced iron.

5. The oxygen absorbing composition of claim 1, wherein said milled electrolyte comprises sodium chloride.

6. An oxygen-absorbing composition as set forth in claim 1 wherein said milled iron is present by weight in an amount of between about 50% and 98%, and wherein said milled electrolytic acidifier is present by weight in an amount of between about 1% and 30%, and wherein said milled electrolyte is present by weight in an amount of at least about 0.1%.

7. An oxygen-absorbing composition as set forth in claim 1 wherein said milled iron is present by weight in an amount of between about 75% and 95%, and wherein said milled electrolytic acidifier is present by weight in an amount of between about 4% and 20%, and wherein said milled electrolyte is present by weight in an amount between about 0.5% and 4%.

8. An oxygen-absorbing composition as set forth in claim 1 wherein said milled iron is present by weight in an amount of between about 80% and 90%, and wherein said milled electrolytic acidifier is present by weight in an amount of between about 5% and 18%, and wherein said milled electrolyte is present by weight in an amount between about 1% and 3%.

9. An oxygen-absorbing composition for combining with a resin as a component thereof to effect oxygen-absorption consisting essentially of relatively sufficient proportions by weight, milled iron, milled electrolytic acidifier, and milled electrolyte, said milled iron, milled electrolytic acidifier, and milled electrolyte being of a size range wherein the majority of each is between about 1 micron and about 80 microns, wherein an average particle size of the milled electrolyte and milled electrolytic acidifier is approximately 8 microns and wherein the average particle size of the milled iron is approximately 28 microns, wherein said milled electrolytic acidifier is selected from the group consisting of potassium bisulfate and sodium bisulfate.

10. An oxygen-absorbing composition as set forth in claim 9 wherein said iron, electrolytic acidifier, and electrolyte are milled separately and then combined.

11. An oxygen-absorbing composition as set forth in claim 9 wherein said iron, electrolytic acidifier, and electrolyte are combined and thereafter milled together.

12. An oxygen-absorbing composition for combining with a resin as set forth in claim 9 wherein said iron is sponge grade hydrogen reduced iron.

13. The composition of claim 9 wherein the electrolyte comprises sodium chloride.

14. In combination: a resin and an oxygen-absorbing composition as a component of said resin comprising in relatively sufficient proportions by weight milled iron, milled electrolytic acidifier, and an electrolyte, the majority of said iron being of a size range of between about 1 micron and about 80 microns, wherein an average particle size of the milled electrolyte and milled electrolytic acidifier is approximately 8 microns and wherein the average particle size of the milled iron is approximately 28 microns, wherein said iron, electrolytic acidifier, and electrolyte are milled separately and then combined, and wherein said acidifier is selected from the group consisting of potassium bisulfate and sodium bisulfate.

15. The combination as set forth in claim 14 wherein the majority of said electrolytic acidifier is of a size range of between about 1 micron and about 80 microns.

16. An oxygen-absorbing composition for combining with a resin as set forth in claim 14 wherein said iron is sponge grade hydrogen reduced iron.

17. An oxygen-absorbing composition for combining with a resin as a component thereof to effect oxygen-absorption comprising in relatively sufficient proportions by weight iron in an amount of between about 50% and 98%, an electrolytic acidifier, selected from the group consisting of potassium bisulfate and sodium bisulfate, in an amount of between about 1% and 30%, and an electrolyte in an amount of at least 0.1%, the majority of said iron and said electrolyte and said electrolytic acidifier all being of a size range of between about 1 micron and about 150 microns, wherein an average particle size of the milled electrolyte and milled electrolytic acidifier is approximately 8 microns and wherein the average particle size of the milled iron is approximately 28 microns, said iron, electrolytic acidifier, and electrolyte being initially combined and thereafter milled together.

18. An oxygen-absorbing composition as set forth in claim 17 wherein the majority of said iron is of a size range of between about 100 microns and about 3 microns, and wherein the majority of said electrolytic acidifier is of a size range of between about 100 microns and about 3 microns, and wherein the majority of said electrolyte is of a size range of between about 100 microns and about 3 microns.

19. An oxygen-absorbing composition as set forth in claim 17 wherein the majority of said iron is of a size range of between about 50 microns and about 3 microns, and wherein the majority of said electrolytic acidifier is of a size range of between about 50 microns and about 3 microns, and wherein the majority of said electrolyte is of a size range of between about 50 microns and about 3 microns.

20. The composition of claim 17 wherein said electrolyte comprises sodium chloride.

* * * * *